United States Patent
Noguchi et al.

(10) Patent No.: US 6,903,652 B2
(45) Date of Patent: Jun. 7, 2005

(54) INPUT APPARATUS FOR VEHICLE-INSTALLED INSTRUMENTS

(75) Inventors: Kunihiko Noguchi, Tokyo (JP); Hirohisa Meguro, Tokyo (JP); Norio Takaku, Tokyo (JP); Akihiko Tsukui, Tokyo (JP); Keiko Igarashi, Tokyo (JP); Masatoshi Arai, Tokyo (JP)

(73) Assignee: Calsonic Kansei Corporation, Tokyo (JP)

( * ) Notice: Subject to any disclaimer, the term of this patent is extended or adjusted under 35 U.S.C. 154(b) by 35 days.

(21) Appl. No.: 10/383,220

(22) Filed: Mar. 7, 2003

(65) Prior Publication Data

US 2003/0234764 A1 Dec. 25, 2003

(30) Foreign Application Priority Data

Mar. 8, 2002 (JP) ........................... 2002-064262
Apr. 24, 2002 (JP) ........................... 2002-122766

(51) Int. Cl.⁷ .............................. B60Q 1/00; G09G 5/08
(52) U.S. Cl. ................... 340/425.5; 340/461; 340/525; 345/163; 345/156; 345/167; 701/36; 700/17; 700/83; 708/131; 341/35
(58) Field of Search .................. 340/425.5, 995.16, 340/461, 525, 678, 691.5; 345/700, 716, 156, 184, 161, 163, 160, 167, 164, 764, 168, 902, 961; 701/1, 36, 49, 58; 700/17, 83; 708/131; 200/61.85, 505, 520, 293.1, 293; 341/20, 35, 21, 22

(56) References Cited

U.S. PATENT DOCUMENTS 5,045,842 A * 9/1991 Galvin ...................... 345/161
6,241,611 B1 * 6/2001 Takeda et al. .............. 463/38

FOREIGN PATENT DOCUMENTS

| DE | 101 05 177 | 8/2002 |
| EP | 1 258 385 | 11/2002 |
| JP | 10-297391 | 11/1998 |
| JP | 2000-276976 | 10/2000 |

OTHER PUBLICATIONS

Patent Abstracts of Japan, vol. 2003, No. 10, Oct. 8, 2003, JP 2003–168346, Jun. 13, 2003.
Patent Abstracts of Japan, vol. 2000, No. 13, Feb. 5, 2001, JP 2000–276976, Oct. 6, 2000.
Patent Abstracts of Japan, vol. 013, No. 397, Sep. 5, 1989, 01–142958, Jun. 5, 1989.
Patent Abstracts of Japan, vol. 1998, No. 13, Nov. 30, 1998, JP 10–214543, Aug. 11, 1998.

* cited by examiner

*Primary Examiner*—Donnie L. Crosland
(74) *Attorney, Agent, or Firm*—Foley & Lardner LLP

(57) ABSTRACT

A input apparatus for vehicle-installed instruments includes main input unit (operation unit) being placed in the proximity of a driver's seat for a user (driver) to switch a plurality of indicators displayed on a display screen into a selection mode and select any desired one of the indicators, thereby operating a vehicle-installed instrument. The main input unit includes leg parts and a palm support part extended in a lateral direction from the upper ends of the leg parts, a plurality of operation switches are placed on the opposite side of either of the leg parts to the extension direction, and an operation dial is placed on a side of the palm support part, enabling the user to move the indicators displayed on the display screen and switch one of the indicators into a selection mode by operating the operation switches and the operation dial.

7 Claims, 18 Drawing Sheets

FIG. 6A
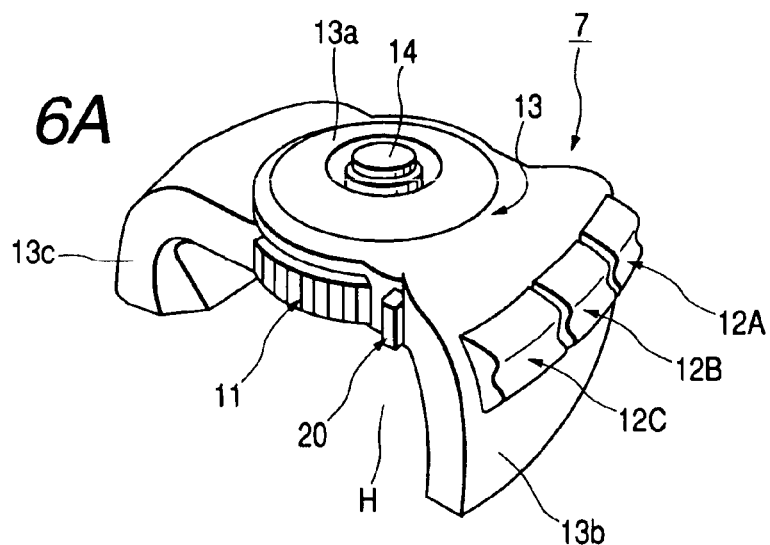
FIG. 6B
(SIDE VIEW)
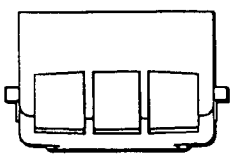
(LEFT SIDE VIEW)    (PLAN VIEW)    (RIGHT SIDE VIEW)    (BOTTOM VIEW)
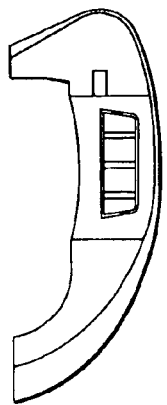 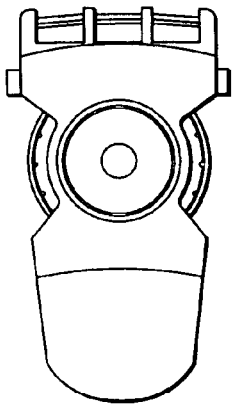 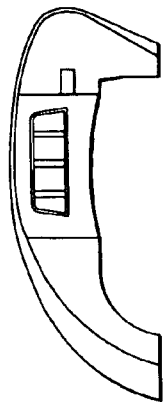 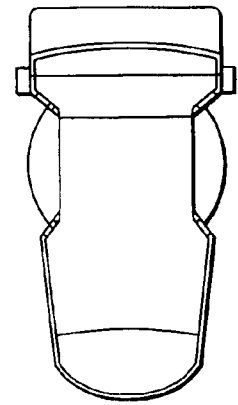
(FRONT VIEW)
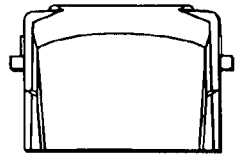

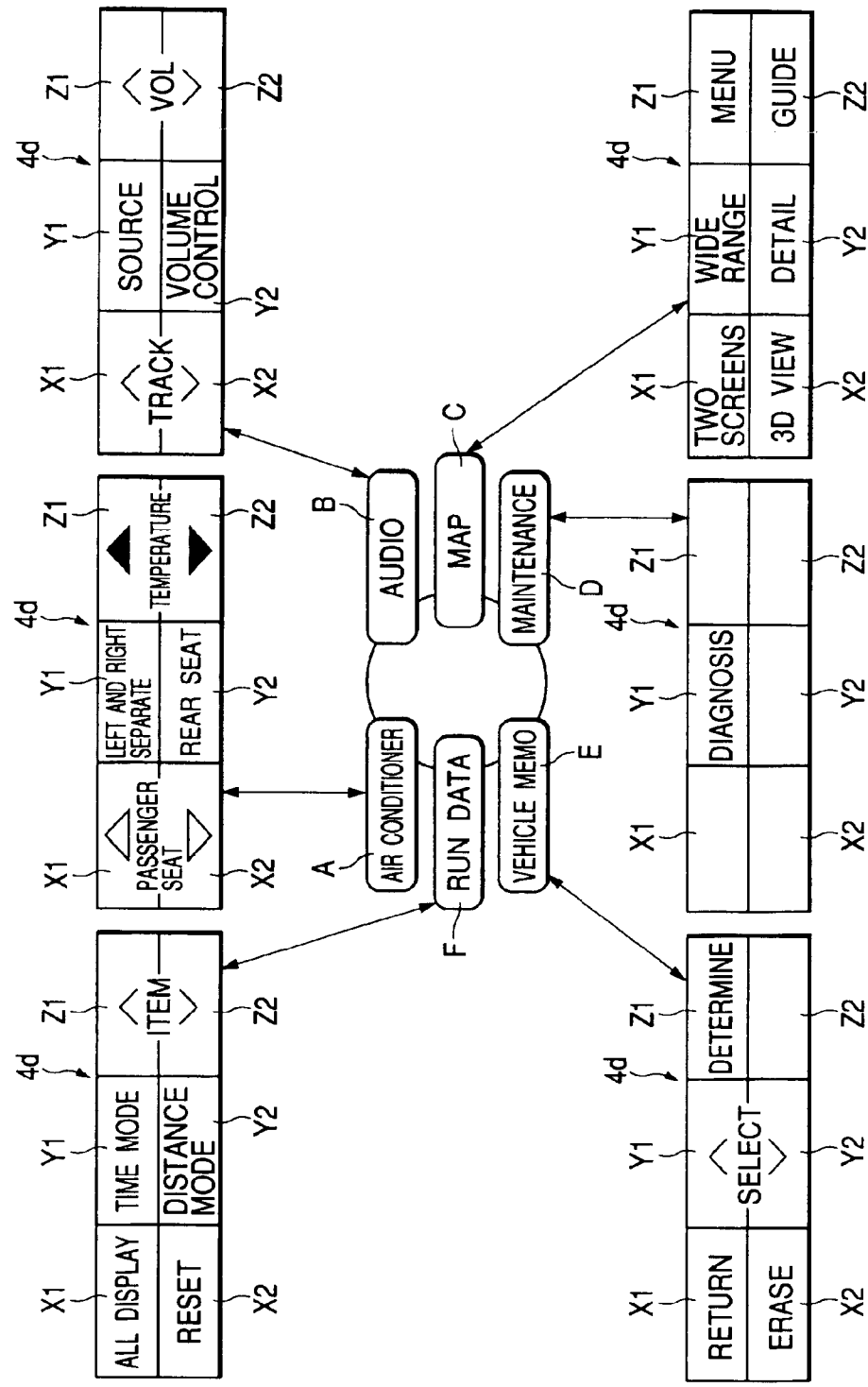

INPUT APPARATUS FOR VEHICLE-INSTALLED INSTRUMENTS

The present disclosure relates to the subject matter contained in Japanese Patent Application No. 2002-064262 filed on Mar. 8, 2002 and in Japanese Patent Application No. 2002-122766 filed on Apr. 24, 2002, which are incorporated herein by reference in its entirety.

BACKGROUND OF THE INVENTION

1. Field of the Invention

This invention relates to a input apparatus for vehicle-installed instruments for enabling the user to perform collective switching operation of the drive state of each of electrical instruments installed in a vehicle, such as an Audio/Video components or an air conditioner of the vehicle.

2. Description of the Related Art

Various units for a driver to operate electrical instruments installed in a vehicle (hereinafter referred to simply as "vehicle-installed instruments") using an integrated switch operatable by a driver sitting on a driver's seat have been proposed from the viewpoints of saving in installation space and operability with recent advanced electronization of vehicles. Some of the units are now commercially practical. Such a unit is disclosed, for example, in JP-A-2000-276976 showing an art of using a multifunction switch to set an audio components and an air conditioner installed in a vehicle. The unit will be discussed below.

FIG. 22 is a schematic representation showing the configuration of the multifunction switch in the related art.

In the figure, element 100 is a multifunction switch having a plurality of switches collectively placed so as to enable the user to perform operation in a state of grasping the multi-function switch with one palm of the user, element 101 is a mouse-shaped switch case of the multifunction switch 100, elements 102A, 102B, and 102C are press operation switches placed in marginal end parts of the switch case 101, and element 102D is an operation switch for the user to set the electric instruments as the user turns a dial projected from one side of the switch case 101. A guide display of setting the multifunction switch 100 and a display screen for displaying the setup state (not shown) are placed at positions where the user operating the multifunction switch 100 easily visually recognizes the display.

JP-A-10-297391 discloses an invention relating to an automobile switch unit having a joystick in place of the operation switch 102D to move a cursor displayed on the above-mentioned display screen to any desired position on the display screen. The switch unit does not have any structure higher than the operation part in the periphery of the joystick switch so as not to hinder swing operation, and includes a plurality of press switches comparatively low in height in the periphery of the joystick switch.

However, there is a problem that the switch units in the related arts are thus configured and therefore if it becomes necessary for the user to operate any of the switches while driving the vehicle, the user gropes for the switch and thus cannot immediately find out the position of the switch.

SUMMARY OF THE INVENTION

It is therefore an object of the invention to provide an apparatus that the user can easily find out even by groping for the apparatus and can easily understand how to place his or her hand on.

According to the invention, there is provided an input apparatus for vehicle-installed instruments having: an operation unit being placed in the proximity of a driver s seat, wherein the operation unit including: a pair of leg parts; a palm support part extended in a lateral direction from upper end of the leg parts; a plurality of operation switches placed on an outer side of at least one of the leg parts; and an operation dial placed on a side of the palm support part; wherein the operation switches and the operation dial are operatable by a user to switch any desired indicator from a plurality of indicators displayed on a display screen into a selected status and to enter a selection of the desired indicator, thereby operating a vehicle-installed instrument.

BRIEF DESCRIPTION OF THE DRAWINGS

The above objects and advantages of the present invention will become more apparent by describing in detail preferred exemplary embodiments thereof with reference to the accompanying drawings, wherein:

FIG. 6A is a plan schematic drawing of the main input unit 7 shown in FIG. 5 and FIG. 6B is six views to show a specific example when the main input unit 7 shown in FIG. 6A is actually designed;

FIG. 10 is a general schematic representation of state transition from the menu screen to each control screen;

DETAILED DESCRIPTION OF THE PREFERRED EMBODIMENTS

Referring now to the accompanying drawings, there is shown a preferred embodiment of the invention.

Figure 1:
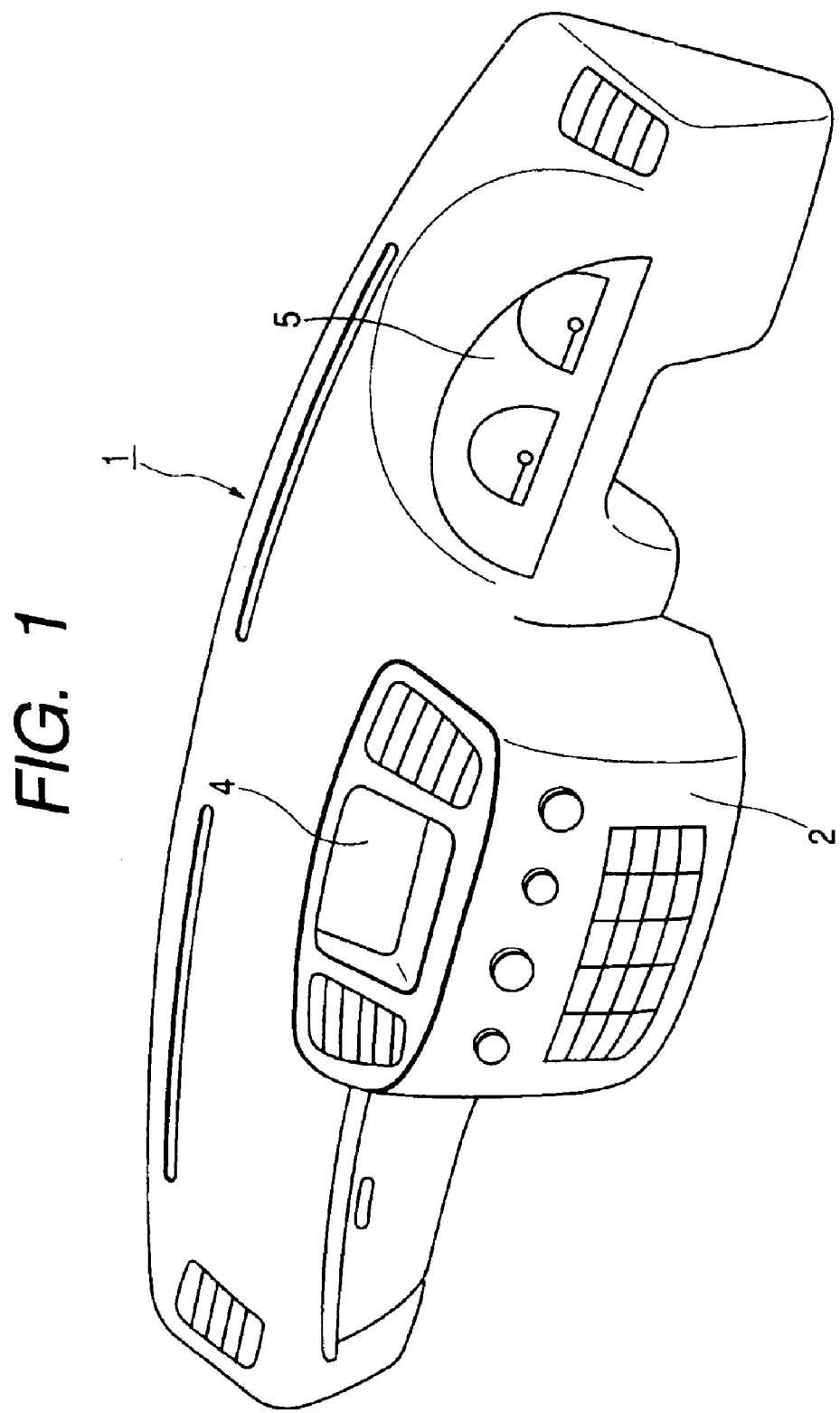
FIG. 1 is a perspective view to show an instrument panel of a vehicle having a vehicle-installed instrument operation unit according to a preferred embodiment of the invention.

FIG. 1 is a perspective view to show an instrument panel of a vehicle being placed in front of a driver's seat and having a display screen for displaying the operation state when a input apparatus in the preferred embodiment of the invention is operated.

In the figure, element 1 is an instrument panel placed forward of a vehicle compartment, element 2 is a center console being placed at the center of the instrument panel 1 for partitioning a driver's seat and a passenger seat, element 4 is a display screen being placed on the top of the center console 2 where a driver 3 can visually recognize the display in a driving attitude, and element 5 is an instrument board where a speed meter and the like are placed.

Next, the input apparatus according to the invention will be discussed.

Figure 2:
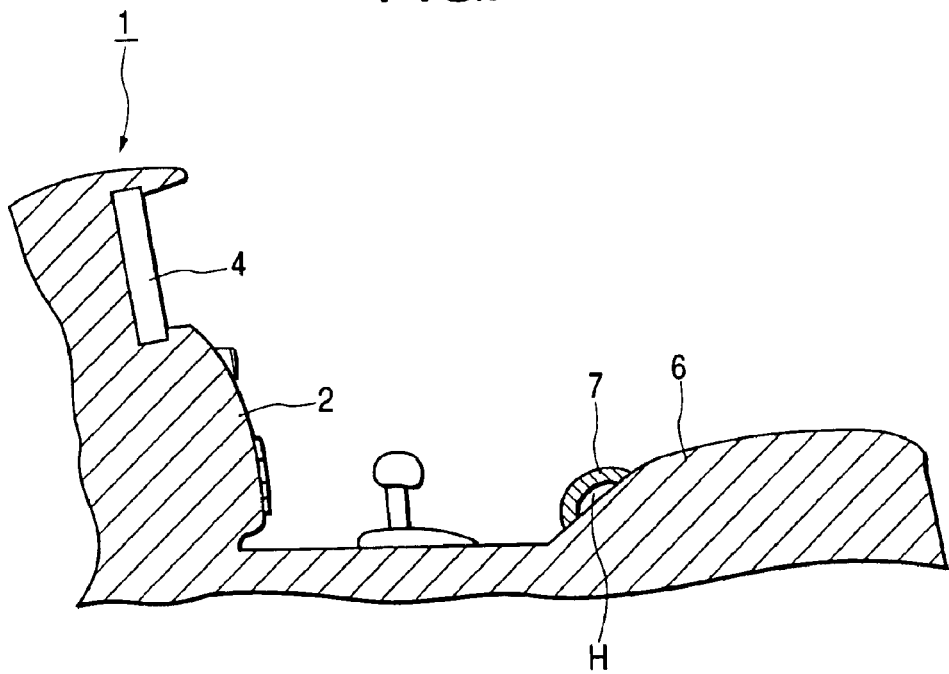
FIG. 2 is a schematic representation to show the schematic longitudinal cross section of a vehicle compartment according to the embodiment of the invention.

FIG. 2 is a schematic representation to show the schematic longitudinal cross section of the vehicle compartment with respect to the instrument panel 1, the display screen 4, the center console 2, and an arm rest 6 being extended from below the center console 2 to the back of the vehicle and contiguous with the center console 2 in the vehicle compartment.

In the figure, element 7 is a main input unit (which represents the operation unit according to the invention) being placed on the front end side of the arm rest 6 for the driver 3 to perform groping operation of setting or selecting various vehicle-installed instruments such as an air conditioner, a car navigation system, and an audio components in a comfortable attitude, the attitude such that with an elbow of the driver 3 put on the top of the arm rest 6.

Figure 3:
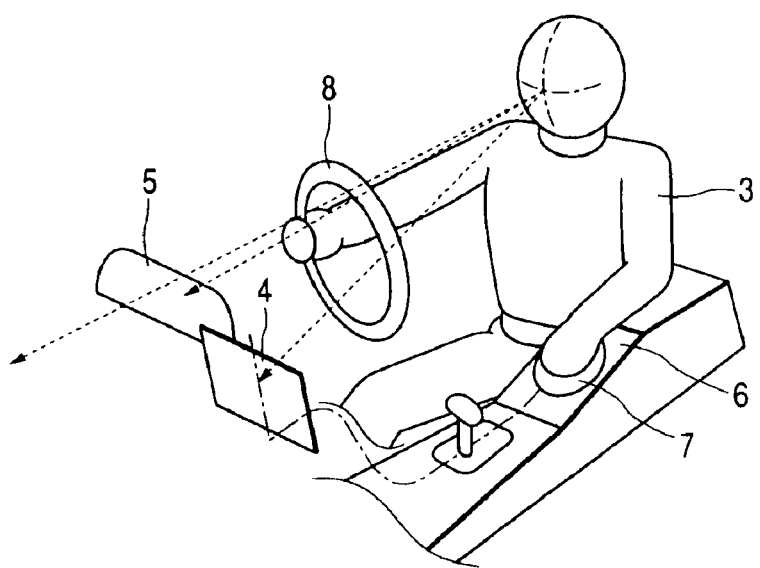
FIG. 3 is a schematic representation to show a state in which a driver grasps the operation unit according to the embodiment of the invention with a palm.

FIG. 3 is a schematic representation to show a state in which the driver 3 sitting in the driver's seat takes a driving attitude, places his or her elbow on the arm rest 6, and grasps the main input unit 7 with a palm with an arm stabilized. As shown in the figure, the main input unit 7 is placed at a position where the driver 3 sitting in the driver's seat can grasp the main input unit 7 in a state in which the driver 3 grips a steering wheel 8 with his or her right hand and stretches his or her arm forward of his or her body naturally with his or her elbow lightly bent forward from just below the left arm. The driver 3 can grope for a hollow H formed below the main input unit 7, thereby finding out a jog dial 11 placed above the hollow H and further touching operation switches 12A, 12B, and 12C without grasping the main input unit 7 with his or her palm which checking the position of the main input unit 7 during driving the vehicle; the driver 3 can perform easy switch operation.

The display screen 4 is placed at a position where the driver 3 sitting in the driver's seat can visually recognize the display simply by slightly moving his or her eyes to look ahead of the vehicle or look at the instrument board 5. The drier 3 can perform groping operation of the main input unit 7 with one hand while seeing the display screen 4 and can set the vehicle-installed instruments with the driving attitude kept with the scene ahead of the vehicle or the instrument board 5 in view.

Figure 4A:
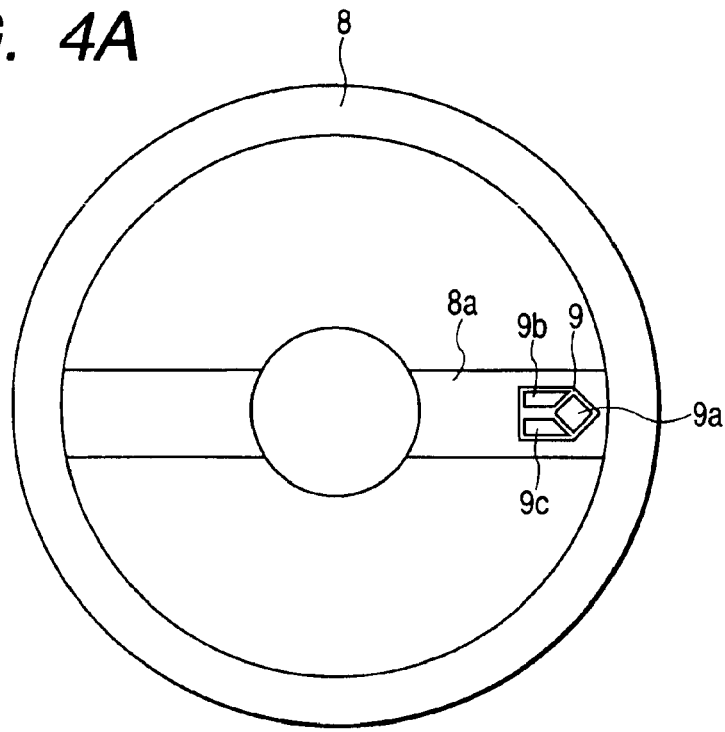
FIG. 4A is a plan schematic drawing to show an auxiliary input unit 9 placed on a steering wheel 8 and FIG. 4B is a plan view of a specific example of actual design of the auxiliary input unit 9 placed on the steering wheel 8 shown in FIG. 4A.

FIG. 4A is a conceptual schematic drawing to describe an auxiliary input unit 9 placed on a hub 8a of the steering wheel 8. The auxiliary input unit 9 is placed leaning to the outer peripheral side of the steering wheel 8 so that the driver 3 can operate the main input unit 7 (described later). The driver 3 operates the main input unit 7 while seeing the display screen 4. In the figure, element 9a is a multi-directional operation switch having switches placed at corners and the center of a quadrangular knob. If the driver 3 presses any desired one of the switches at the four corners and the center, the switch is turned on. The multi-directional operation switch 9a corresponds to a joystick switch (described later) and is placed in an outermost part of the steering wheel 8. Element 9b is an audio switch and element 9c is an air conditioner switch; both the switches are placed inside the steering wheel 8 from the placement position of the multi-directional operation switch 9a.

Figure 4B:
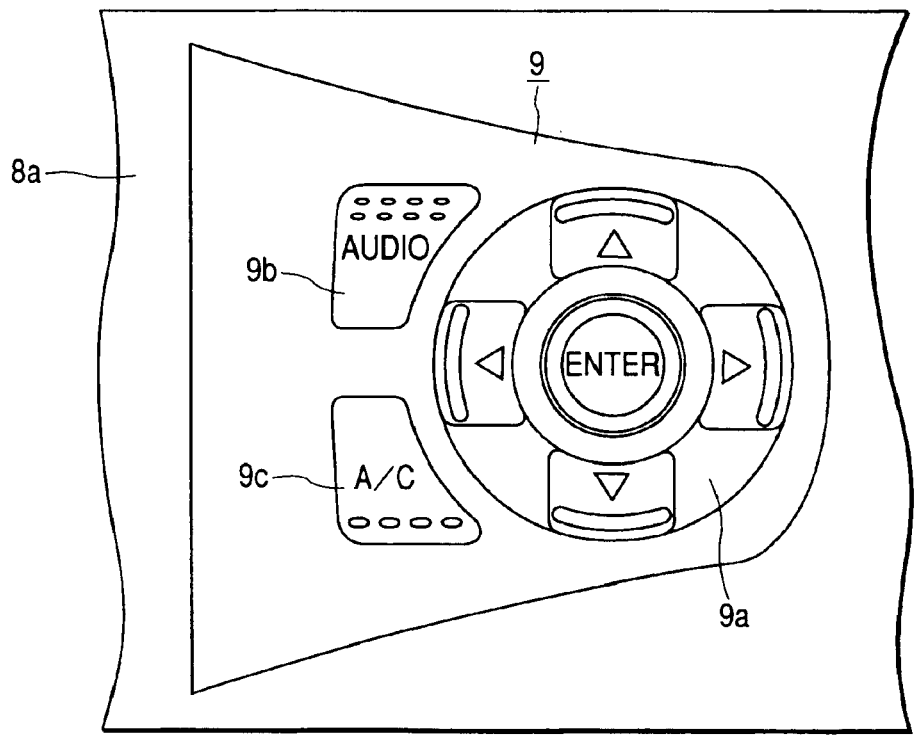

FIG. 4B is a plan schematic drawing as actual design of the auxiliary input unit 9 placed on the steering wheel 8 based on the conceptual drawing of FIG. 4A.

Figure 5:
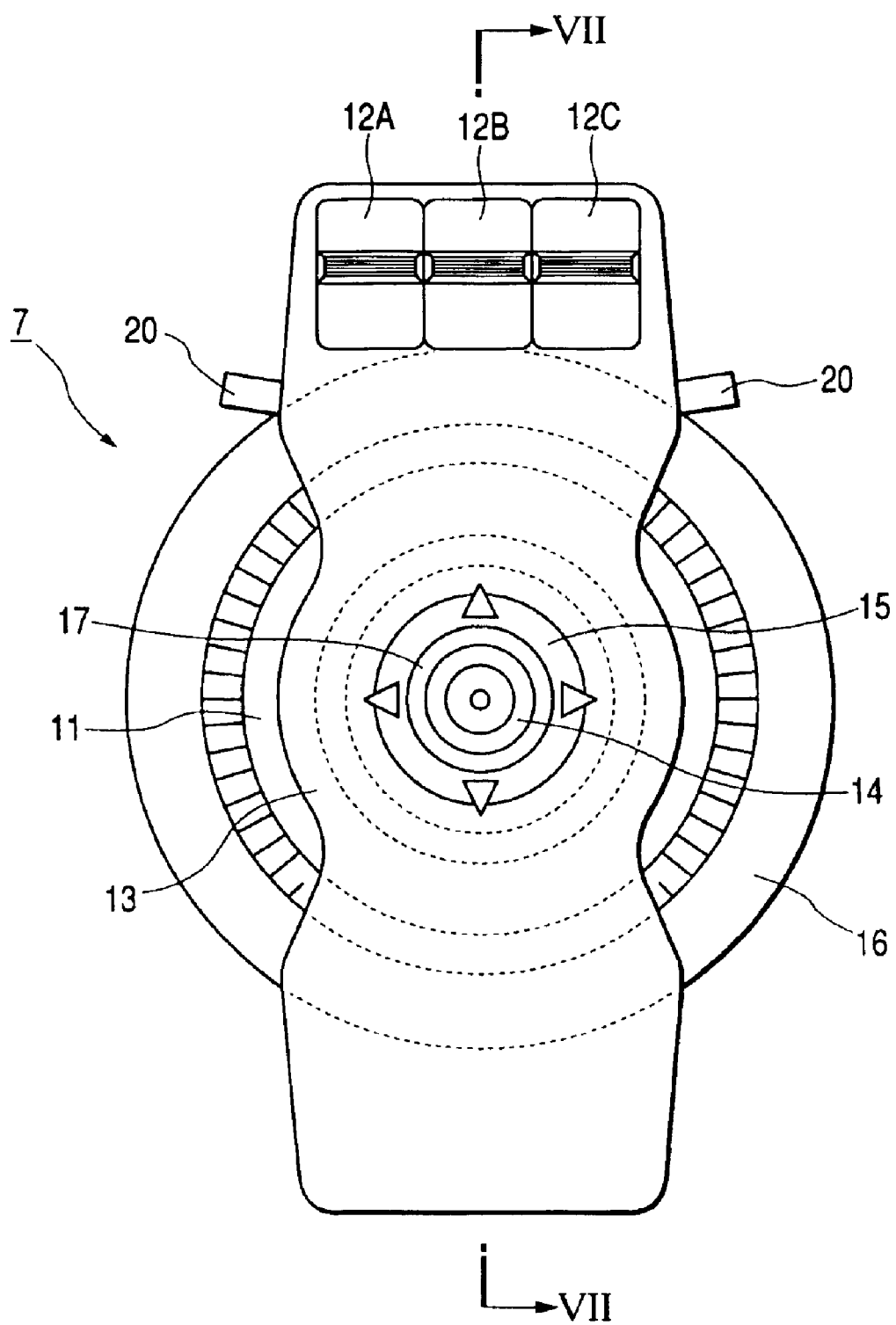
FIG. 5 is a perspective view of the whole configuration of a main input unit 7.
Figure 7:
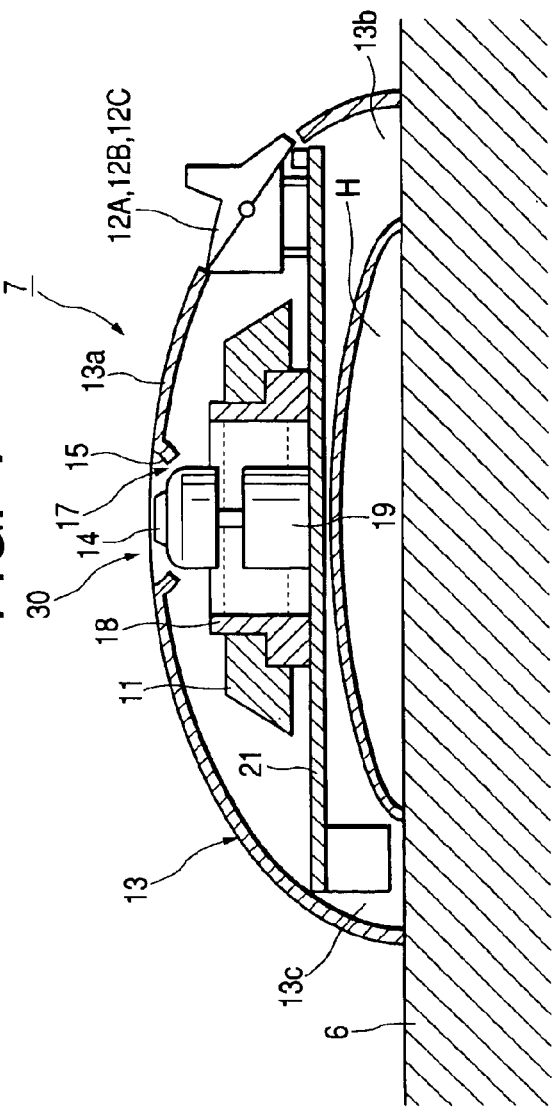
FIG. 7 is a cross-sectional schematic representation taken on line VII—VII in FIG. 5.

FIG. 5 is a plan view of the main input unit 7 from the top thereof, FIG. 6A is a perspective view of the main input unit 7, and FIG. 7 is a cross-sectional schematic representation taken on line VII—VII in FIG. 5.

In the figures, element 11 is a jog dial rotating horizontally relative to the top face of the arm rest 6 in which the main input unit 7 is placed, and elements 12A, 12B, and 12C are seesaw operation switches (operation switches) placed on one side of the main input unit 7, namely, the outer side of one leg part 13b placed upright in a direction almost at right angles to the top face of the arm rest 6.

Figure 8:
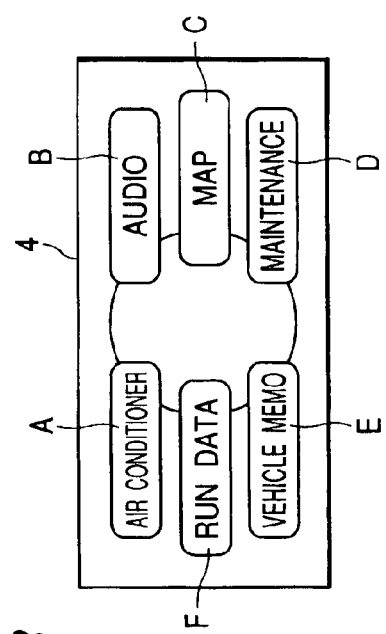
FIG. 8 is a drawing to show a menu screen (first-layer screen) when the main input unit 7 is in an operation state.
Figure 9A:
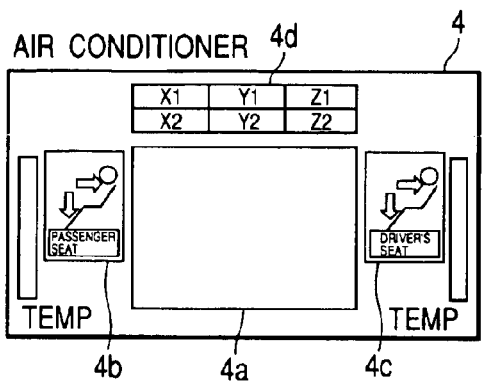
FIGS. 9A–9F are drawings to show a control screen (second-layer screen) displayed when a control target is selected by operating a jog dial 11 of the main input unit 7.
Figure 9D:
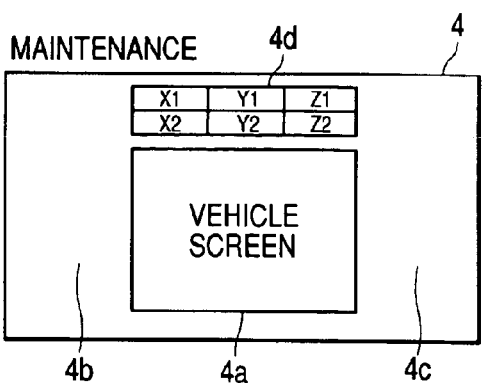
Figure 9B:
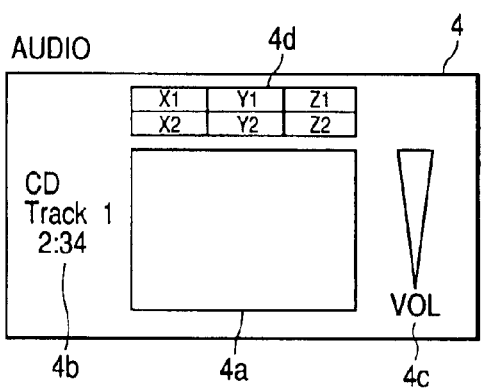
Figure 9E:
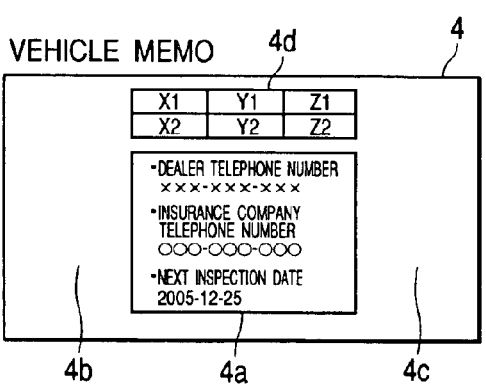
Figure 9C:
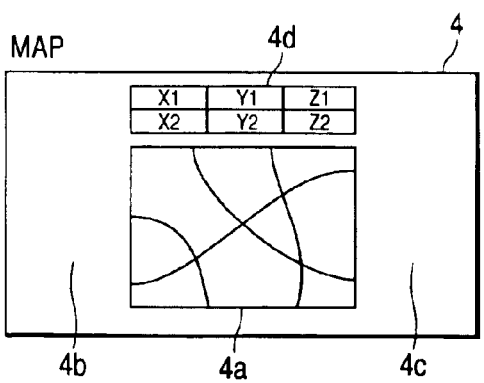
Figure 9F:
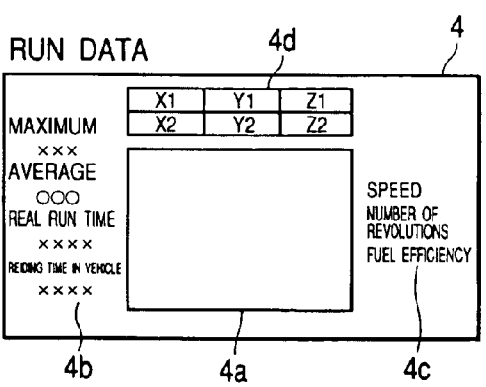

For example, when a first-layer screen is displayed with vehicle-installed instrument selection icons (indicators) A to F of a menu screen (described later) arranged like a horizontal ellipse as shown in FIG. 8, as the driver 3 rotates the jog dial 11, the cursor moves over the icons A to F and as the driver 3 turns on either of left and right determination switches 20 placed in a pair, the function corresponding to the icon A to F is selected. That is, any function of AIR CONDITIONER A, AUDIO B, MAP C, MAINTENANCE D, VEHICLE MEMO E, or RUN DATA F is selected.

The operation switches 12A, 12B, and 12C are function selection switches for the driver 3 to perform selection operation in indicators displayed in six display areas X1, X2, Y1, Y2, Z1, and Z2 displayed in the upper part of each of second-layer screens (FIG. A, FIG. B, FIG. C, FIG. D, FIG. E, and FIG. F) into which the first-layer screen (FIG. 8) operated by the jog dial 11 is switched as the driver 3 turns on the determination switch 20 when the first-layer screen is displayed.

The operation switches 12A, 12B, and 12C are placed on an almost vertical plane formed on the front end side of a main unit case 13. When the driver 3 grasps the main unit case 13 with his or her left palm, naturally his or her thumb touches the jog dial 11 projecting from the side of the main input unit 7, his or her forefinger touches the operation switch 12C, his or her middle finger touches the operation switch 12B, and his or her third finger touches the operation switch 12A with the main unit case 13 grasped tightly with his or her palm, so that the driver 3 can easily emphasize all fingertips and can reliably operate the operation switches 12A, 12B, and 12C.

Further, among the operation switches 12A, 12B, and 12C, the operation switch 12C operated with the forefinger is assigned to selection of an often used control target; the operation switch 12B operated with the middle finger is assigned to selection of a second often used control target; and the operation switch 12A operated with the third finger is assigned to selection of a third often used control target, thereby improving operability.

Element 13 is a main unit case of the main input unit 7, and has a palm support part 13a placed in parallel with the top face of the arm rest 6 and a pair of legs 13b and 13c extended downward from the front end and the rear end of the palm support part 13a and attached to the front end part of the arm rest 6. The palm support part 13a is provided with the jog dial 11 and a joystick switch (multi-directional operation switch) 30. A recess part 15 is formed in the proximity of the center of the top face of the main unit case 13, and a joystick switch operation part 14 is placed so that the top of the joystick switch operation part 14 does not project upward from the upper opening end of the recess part 15.

The joystick switch 30 may be any if it can be used as a scroll key; as this kind of switch, for example, a trackball, track pad, a floating switch, or the like is available. The recess part 15 is a cone-shaped bottomless recess part formed in the top face of the main unit case 13 so as to surround the periphery of the joystick switch operation part 14. Element 17 is an insertion hole made in the center of the recess part 15 into which the joystick switch operation part 14 is inserted.

FIG. 7 is a sectional view taken on line VII—VII in FIG. 5 and is a schematic representation to show the schematic longitudinal cross section of the main input unit 7. In FIG. 7, element 18 is rotation operation detection unit for detecting rotation operation of the jog dial 11, and element 19 is a joystick switch operation detection unit for detecting operation of the joystick switch operation part 14. Element 21 is a circuit board where the rotation operation detection unit 18, the joystick switch operation detection unit 19, mechanical parts of the operation switches 12A, 12B, and 12C, and the like in the main unit case 13 are installed for electric connection.

As shown in FIG. 7, the main unit case 13 of the main input unit 7 forms a bridge shape and the main input unit 7 is fixed at both end parts in the length direction to the front end side of the arm rest 6 and is placed along the back and forth direction of the vehicle like a hand grip. The recess part 15 is formed in the proximity of the center of the top face of the main unit case 13 as described above, and is formed at the center with the insertion hole 17 into which the joystick switch operation part 14 is inserted. The joystick switch operation part 14 is placed upright in the up direction of the main input unit 7 and is freely swung back and forth and from side to side with a finger of the driver 3, so that the display screened on the display screen 4 is scrolled and the cursor displayed thereon is moved in response to swinging of the joystick switch operation part 14. When the determination switch 20 is turned on, then the function displayed on the display screen 4 is selected and determined. The joystick switch operation part 14 has a diameter and a shape not hindering swinging of the joystick switch operation part 14.

FIG. 8 shows a menu screen switched as the jog dial 11 is rotated. When the power is turned on or the menu screen is selected, the vehicle-installed instrument selection icons (indicators) of AIR CONDITIONER A, AUDIO B, MAP C, MAINTENANCE D, VEHICLE MEMO E, and RUN DATA F are displayed throughout the screen like a horizontal ellipse on the display screen 4. As the driver 3 rotates the jog dial 11, the colors of the icons A, B, C, D, E, and F are changed in order accordingly. When the color of any desired icon changed, and the driver 3 turns on the determination switch 20, whereby the function corresponding to the icon is selected and determined. That is, any function of AIR CONDITIONER A, AUDIO B, MAP C, MAINTENANCE D, VEHICLE MEMO E, or RUN DATA F is selected, whereby switching operation is performed.

Consequently, the screen is switched into any of the display screens shown in FIGS. 9A, 9B, 9C, 9D, 9E, and 9F.

The display screens shown in FIGS. 9A, 9B, 9C, 9D, 9E, and 9F correspond to second-layer screens (operation screens of AIR CONDITIONER A, AUDIO B, MAP C, MAINTENANCE D, VEHICLE MEMO E, and RUN DATA F) when the selection screen of the jog dial 11 (menu screen) is the first-layer screen. Each of the second-layer screens is divided into first to fourth display areas 4a to 4d. The first display area 4a at the center of the display screens a visually understandable image of the current control target being selected (AIR CONDITIONER, AUDIO, MAP, MAINTENANCE, VEHICLE MEMO, or RUN DATA). The second and third display areas 4b and 4c at the left and the right of the first display area 4a display the current control state and the current condition data in real time. The fourth display area 4d on the top of the display screens a switch change area where selection operation of the operation switches 12A, 12B, and 12C is performed. FIG. 10 is a schematic representation to schematically illustrate the whole state transition from the menu screen to each control screen in a simple and easy-to-understand manner.

As shown in FIG. 10, the switch change area of the fourth display area 4d is divided into six switch display areas X1, X2, Y1, Y2, Z1, and Z2. The switch display areas X1 and X2 indicate areas selected by operating the operation switch 12A placed at the left of the operation switches 12A, 12B, and 12C; the switch display areas Y1 and Y2 indicate areas selected by operating the operation switch 12B placed at the center of the operation switches 12A, 12B, and 12C; and the switch display areas Z1 and Z2 indicate areas selected by operating the operation switch 12C placed at the right of the operation switches 12A, 12B, and 12C.

For example, when the indicator AUDIO is selected, if the driver 3 pulls up the operation switch 12A, for example, the track number of a CD is changed to a larger track number; if the driver 3 presses down the operation switch 12A, for example, the track number of a CD is changed to a smaller track number.

If the driver 3 pulls up the operation switch 12B, the source of a CD is applied; and if the driver 3 presses down the operation switch 12B, tone control is applied.

If the driver 3 pulls up the operation switch 12C, the volume is increased; and if the driver 3 presses down the operation switch 12C, the volume is lessened.

Figure 11:
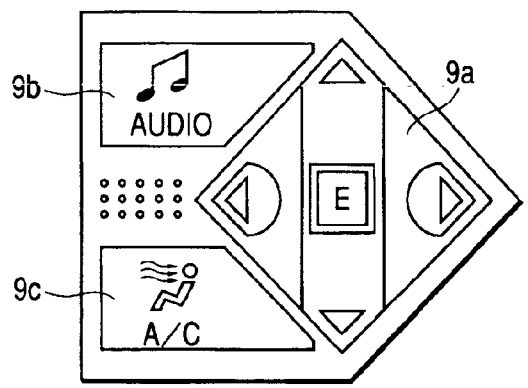
FIG. 11 is a schematic drawing of the auxiliary input unit 9 shown in FIGS. 4A and 4B.

FIG. 11 is a whole switch layout schematic representation of the auxiliary input unit 9 placed on the hub 8a of the steering wheel 8 of the vehicle shown in FIG. 4. The auxiliary input unit 9 has the operation switches 9b and 9c corresponding to the generally frequently used AIR CONDITIONER and AUDIO machine selection icons of the vehicle-installed instrument selection icons (indicators) of AIR CONDITIONER A, AUDIO B, MAP C, MAINTENANCE D, VEHICLE MEMO E, and RUN DATA F switched and made selectable as the jog dial 11 is operated. The multi-directional operation switch 9a is a scroll switch (corresponding to the joystick switch 30) for control selection executed after function selection is executed by operating the operation switch 9b, 9c. Which of the main input unit 7 and the auxiliary input unit 9 is to be assigned priority when an ignition switch is turned on is determined as switching operation of a set switch (not shown) is performed.

The driver 3 can press any one of the four corners of the multi-directional operation switch 9a for scrolling up and down and from side to side. If the driver 3 uses the multi-directional operation switch 9a to move the cursor to any one of the six switch display areas X1, X2, Y1, Y2, Z1, and Z2 shown in FIG. 13 and then presses the center (part represented as E in FIG. 11) of the multi-directional operation switch 9a, the switch display area is selected and determined.

Figure 12:
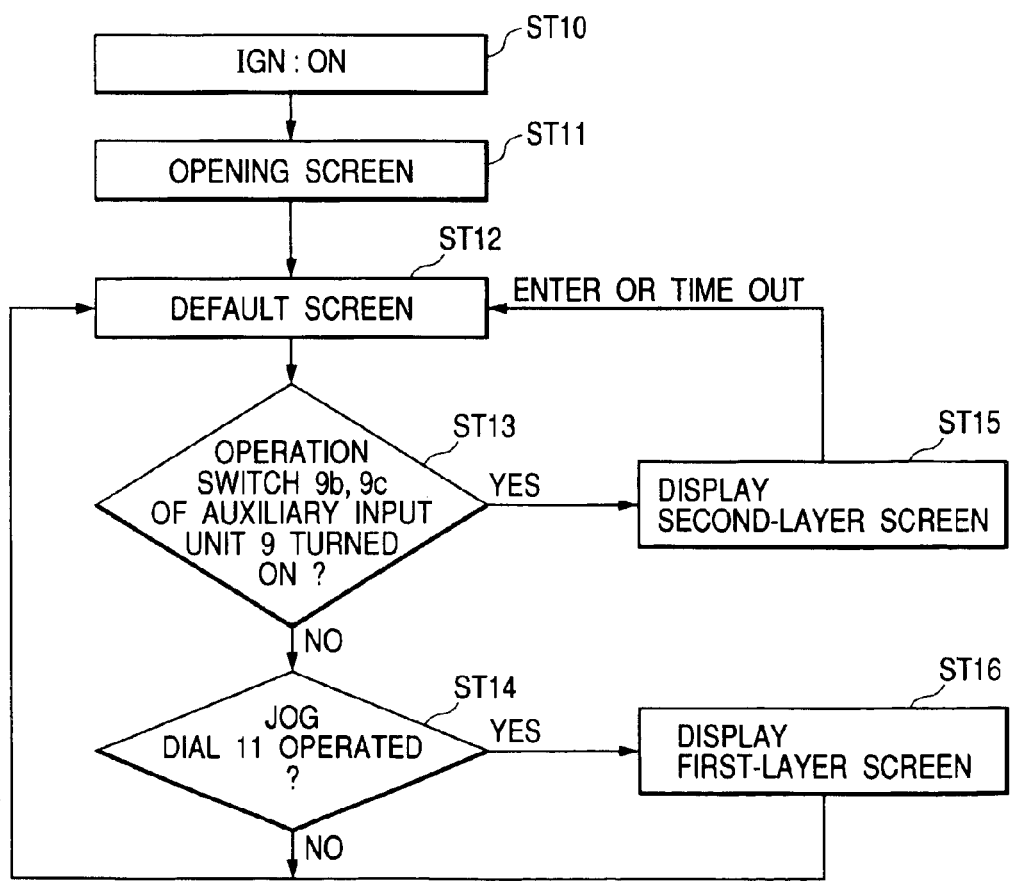
FIG. 12 is a flowchart to show switching between the main input unit 7 and the auxiliary input unit 9.

That is, as shown in FIG. 12, when the driver 3 turns on the ignition switch (step ST10), an opening screen appears (step ST11) and the display state of a default screen at step ST12 is entered. The default screen always displays an image for the main input unit 7 or the auxiliary input unit 9, whichever is assigned priority. If the driver 3 does not operate any switch, steps ST12, ST13, and ST14 are repeated in order every predetermined time.

At step ST13, whether or not either the operation switch 9b or 9c of the auxiliary input unit 9 is turned on within a predetermined time is determined. If it is determined that the operation switch is not turned on, control goes to step ST14 and whether or not the jog dial 11 of the main input unit 7 is operated within a predetermined time is determined. If it is determined that the jog dial 11 is not operated, control returns to step ST12.

If it is determined at step ST13 that either the operation switch 9b or 9c of the auxiliary input unit 9 is turned on within the predetermined time, the screen is switched to the second-layer screen corresponding to the operation switch 9b or 9c turned on (later described in detail with reference to FIG. 14) (step ST15). When a predetermined time has elapsed since the screen was switched to the second-layer screen, control returns to step ST12.

If it is determined at step ST14 that the jog dial 11 of the main input unit 7 is operated within the predetermined time, the screen is switched to the first-layer screen, for example, the screen in FIG. 8 (step ST15). When a predetermined time has elapsed since the screen was switched to the first-layer screen, control returns to step ST12.

Figure 13:
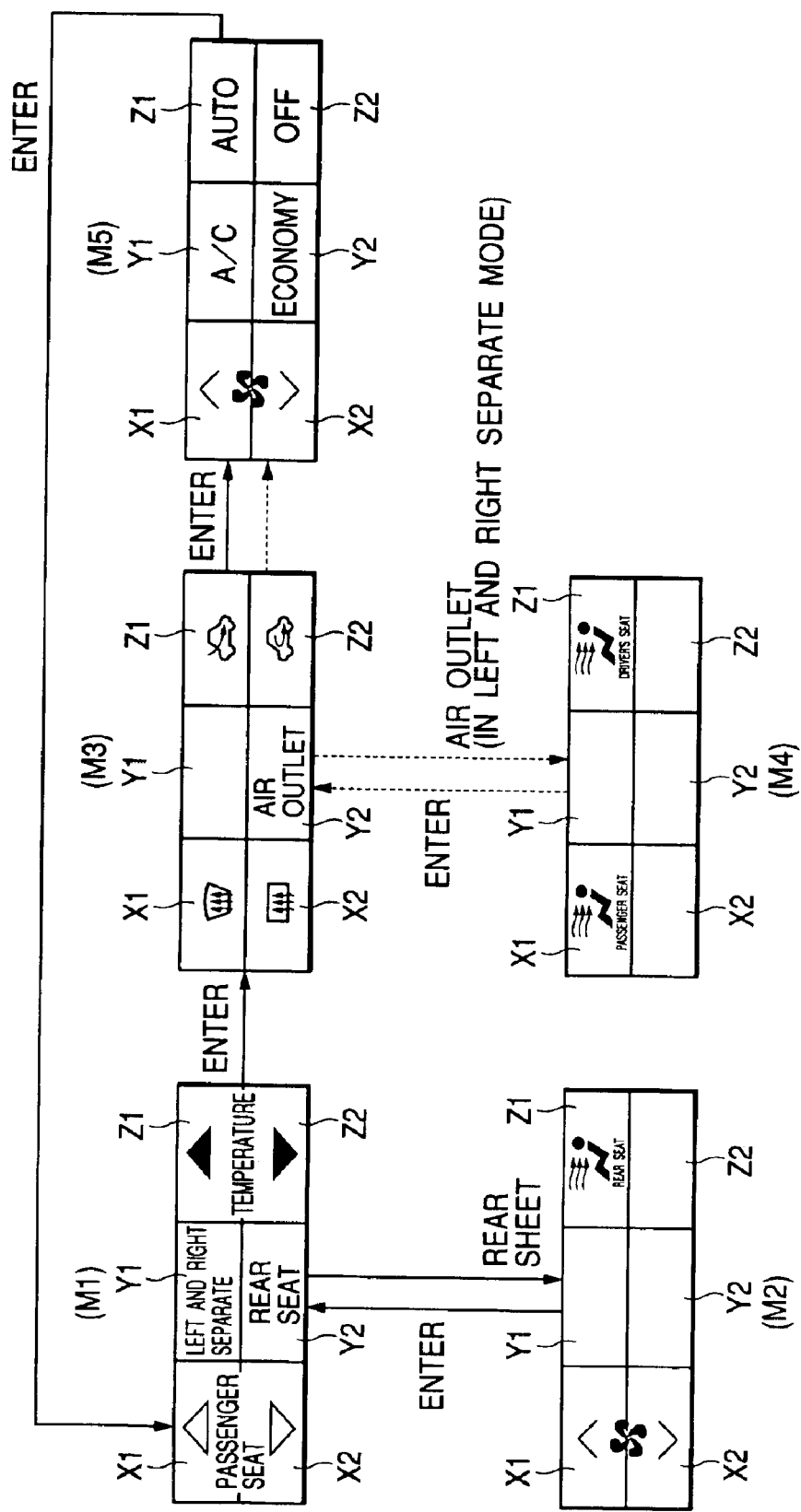
FIG. 13 is a schematic representation to describe a switch operation procedure for switching AIR CONDITIONER operation screens using the auxiliary input unit 9.

FIG. 13 shows the state transition of a part of each control screen in the image displayed on the display screen 4 when the driver 3 turns on the AIR CONDITIONER operation switch 9c of the auxiliary input unit 9; it is the same as the switch change area of the fourth display area 4d shown in FIGS. 9 and 10. That is, the switch display areas X1 and X2 of the six switch display areas X1, X2, Y1, Y2, Z1, and Z2 indicate switch display areas for controlling the temperature, the air quantity, etc., of the left (passenger seat side); the switch display areas Z1 and Z2 indicate switch display areas for controlling the temperature, the air quantity, and the like, of the right (driver s seat side); and the switch display areas Y1 and Y2 at the center indicate areas for selecting control common to the left and the right.

That is, if the driver 3 turns on the AIR CONDITIONER operation switch 9c of the auxiliary input unit 9, a control screen indicated by M1 in FIG. 13 is displayed in the switch change area 4d of the display screen 4. That is, a temperature increase set switch of the passenger seat is displayed in the switch display area X1 and a temperature decrease set switch of the passenger seat is displayed in the switch display area X2. A left and right separate selection switch is displayed in the switch display area Y1 and a rear seat air blowing set switch is displayed in the switch display area Y2. Further, a temperature increase set switch is displayed in the switch display area Z1 and a temperature decrease set switch is displayed in the switch display area Z2.

If the driver 3 operates any of the corners of the multi-directional operation switch 9a, for example, for changing the display color of the switch display area Y2 indicating the rear seat air blowing set switch for selection and then presses the center of the multi-directional operation switch 9a, a control screen indicated by M2 is displayed. That is, an air quantity increase set switch is displayed in the switch display area X1 and an air quantity decrease set switch is displayed in the switch display area X2. A rear seat air blowing start selection switch is displayed in the switch display area Z1. When a predetermined time has elapsed since the display was started, the screen returns to the control screen indicated by M1.

After the screen returns to the control screen, if the driver 3 presses the center of the multi-directional operation switch 9a, since the driver 3 does not press any corner of the multi-directional operation switch 9a at the time, a control screen indicated by M3 is displayed. That is, a front DEF set switch is displayed in the switch display area X1 and a rear DEF set switch is displayed in the switch display area X2. An air outlet selection switch is displayed in the switch display area Y2. Further, an outside air taking-in selection switch is displayed in the switch display area Z1 and an inside air circulation selection switch is displayed in the switch display area Z2.

If the driver changes the display color of the switch display area Y2 indicating the air outlet selection switch for selection and then presses the center of the multi-directional operation switch 9a, a control screen indicated by M4 is displayed. That is, a passenger seat air blowing selection switch is displayed in the switch display area X1 and a driver's seat air blowing selection switch is displayed in the switch display area Z1. When a predetermined time has elapsed since the display was started, the screen returns to the control screen indicated by M3.

After the screen returns to the control screen, if the driver 3 presses the center of the multi-directional operation switch 9a without pressing any corner thereof as previously, a control screen indicated by M5 is displayed. That is, a blown air quantity increase set switch is displayed in the switch display area X1 and a blown air quantity decrease set switch is displayed in the switch display area X2. An air conditioner selection switch is displayed in the switch display area Y1 and an air conditioner economy mode set switch is displayed in the switch display area Y2. Further, an air conditioner auto operation mode selection switch is displayed in the switch display area Z1 and an air conditioner stop switch is displayed in the switch display area Z2. If the driver 3 presses the center of the multi-directional operation switch 9a after the control screen is displayed, the screen returns to the control screen indicated by Ml.

Figure 14:
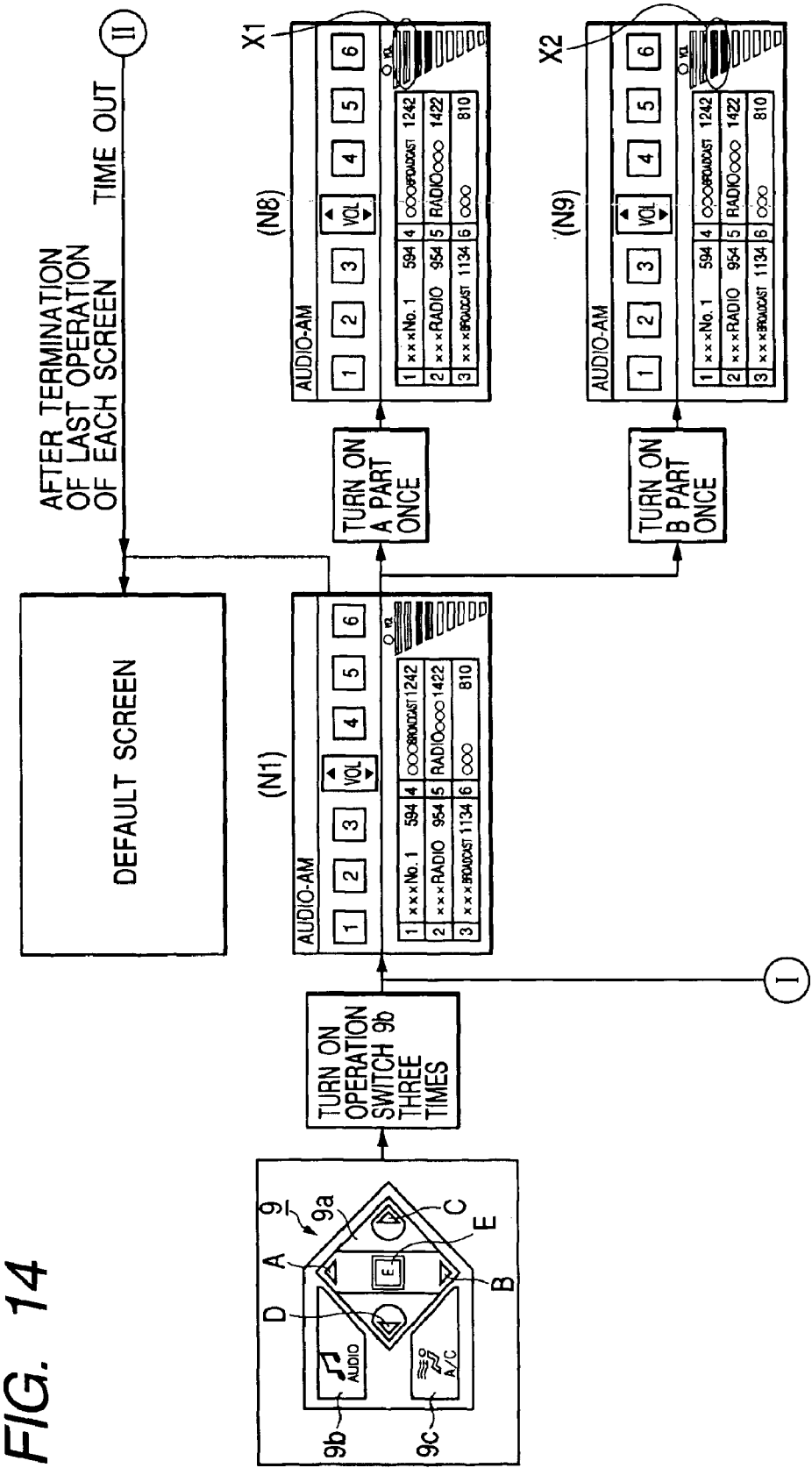
FIG. 14 is a schematic representation to describe a switch operation procedure for switching AUDIO operation screens using the auxiliary input unit 9.
Figure 15:
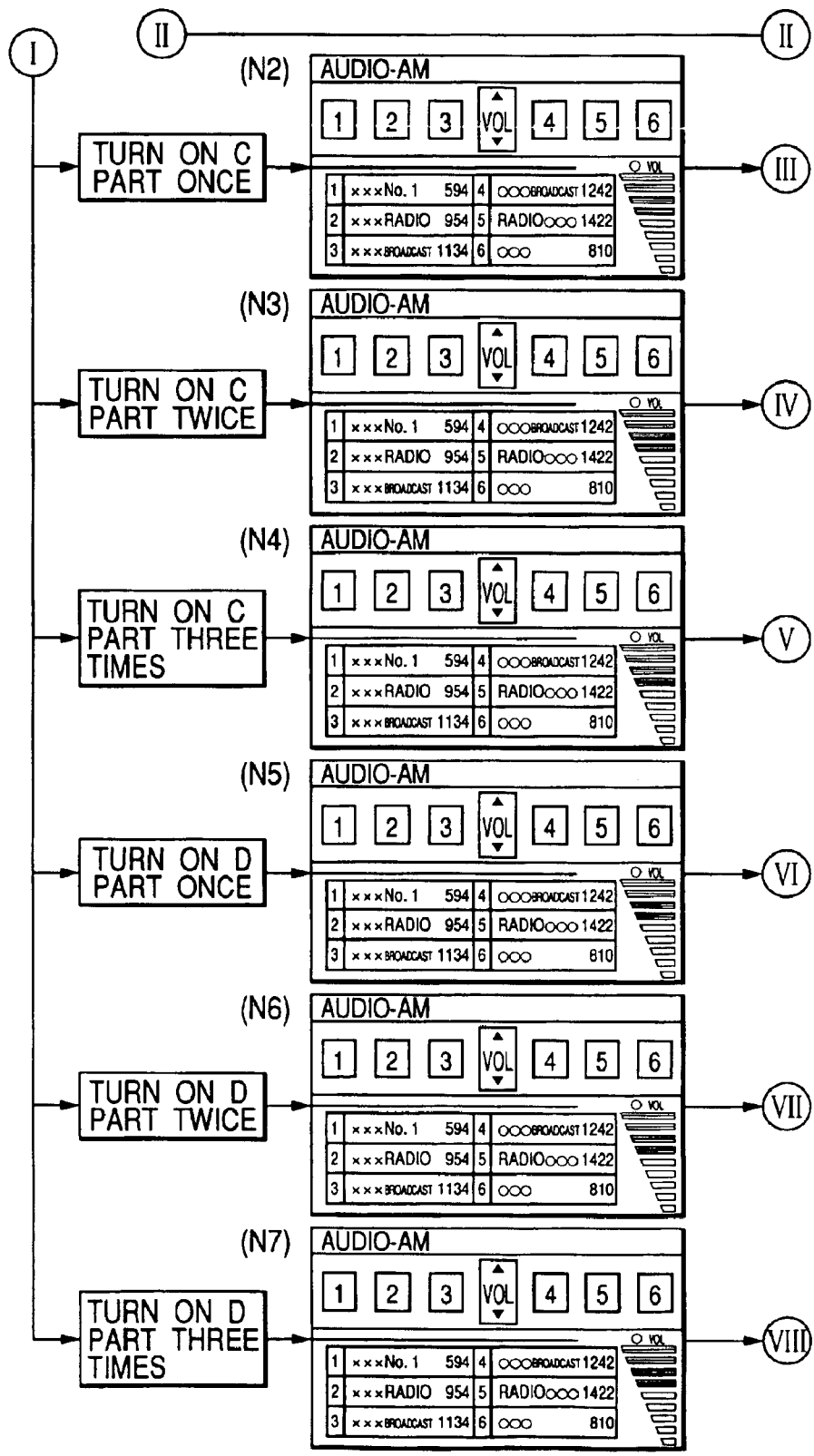
FIG. 15 is a schematic representation to describe a switch operation procedure for switching AUDIO operation screens using the auxiliary input unit 9.
Figure 16:
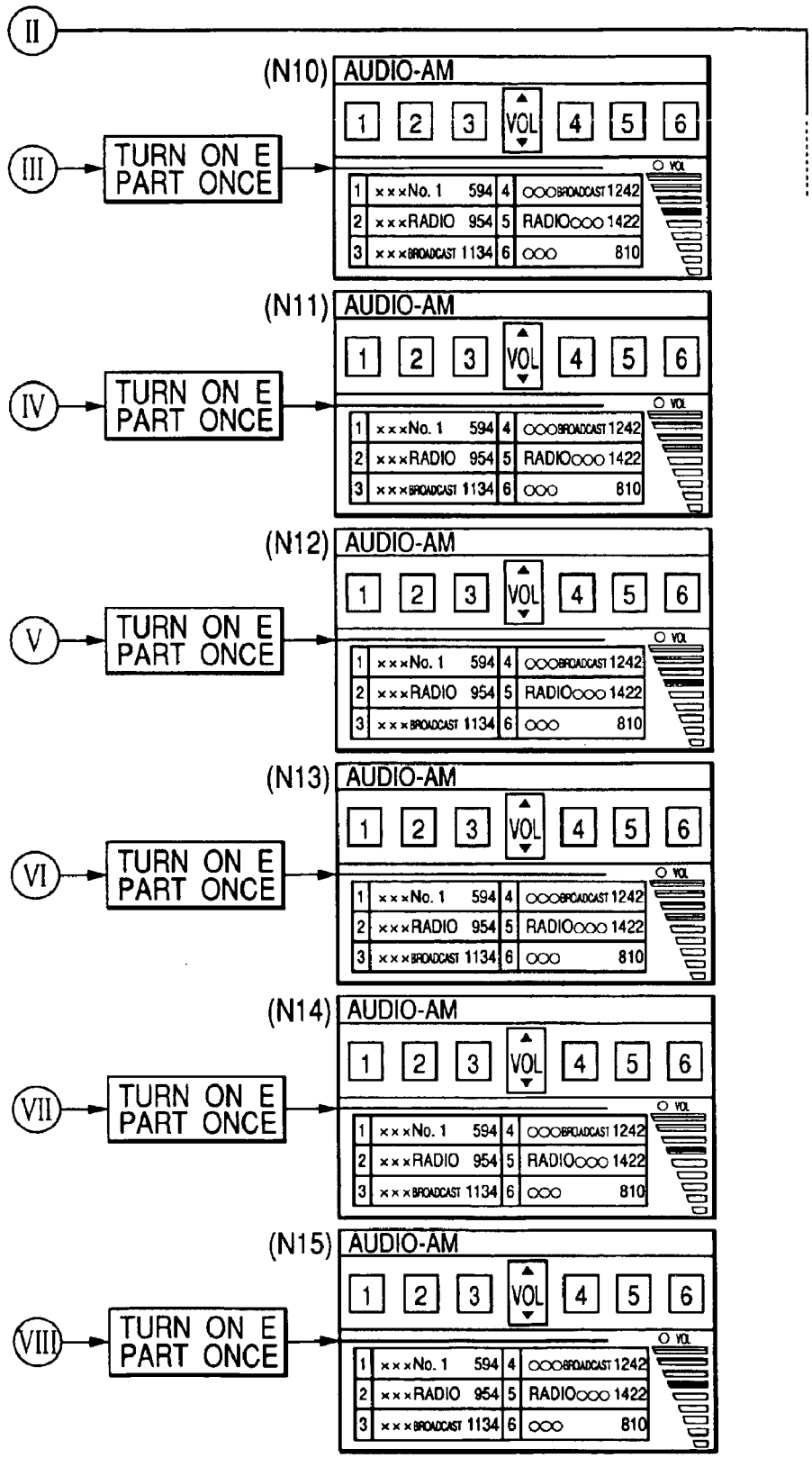
FIG. 16 is a schematic representation to describe a switch operation procedure for switching AUDIO operation screens using the auxiliary input unit 9.

Next, a method of setting the audio components using the auxiliary input unit 9 will be discussed based on FIGS. 14 to 16.

If the driver 3 turns on the operation switch 9b once with his or her thumb while gripping the steering wheel 8 during driving the vehicle, the whole image of the auxiliary input unit 9 is displayed on the display screen 4. If the driver 3 then turns on the operation switch 9b twice, the display mode of the control screen is switched to the mode indicated by N1 and the display color of the display portion of "XXX NO. 1" is changed, indicating that "XXX NO. 1" is selected.

If the driver 3 then turns on the switch indicated by C, of the multi-directional operation switch 9a once, the display color of the display portion of "* BROADCAST" is changed and the display mode of the control screen indicates that "* BROADCAST" indicated by N2 is selected. Next, if the driver 3 turns on the switch indicated by C once more, the display color of the display portion of "RADIO *" is changed and the display mode of the control screen indicates that "RADIO *" indicated by N3 is selected. Further, if the driver 3 turns on the switch indicated by C once more, the display color of the display portion of "**" is changed and the display mode of the control screen indicates that "**" indicated by N4 is selected.

Next, if the driver 3 turns on the switch indicated by D, of the multi-directional operation switch 9a once, the display color of the display portion of "XXX BROADCAST" is changed and the display mode of the control screen indicates that "XXX BROADCAST" indicated by N5 is selected. Next, if the driver 3 turns on the switch indicated by D once more, the display color of the display portion of "XXX RADIO" is changed and the display mode of the control screen indicates that "XXX RADIO" indicated by N6 is selected. Further, if the driver 3 turns on the switch indicated by D once more, the display color of the display portion of "XXX NO. 1" is changed, indicating that "XXX NO. 1" is selected.

Next, if the driver 3 turns on the switch indicated by A, of the multi-directional operation switch 9a once in the display mode indicated by N1, the display color of the portion surrounded by a solid frame X1 at the right of the control screen is changed and the volume is increased. The screen is switched to the display image of the main input unit 7 of the default screen in a predetermined time. On the other hand, if the driver 3 turns on the switch indicated by B, of the multi-directional operation switch 9a once in the display mode indicated by N1, the display color of the portion surrounded by a solid frame X2 at the right of the control screen is changed and the volume is lessened. The screen is switched to the display image of the main input unit 7 of the default screen in a predetermined time.

Next, if the driver 3 presses and turns on the switch E at the center of the multi-directional operation switch 9a in the display mode indicated by N2, selection of "* BROADCAST" is determined. The screen is switched to the display image of the main input unit 7** of the default screen in a predetermined time.

Next, if the driver 3 presses and turns on the switch E at the center of the multi-directional operation switch 9a in the display mode indicated by N3, selection of "RADIO *" is determined. The screen is switched to the display image of the main input unit 7** of the default screen in a predetermined time.

Next, if the driver 3 presses and turns on the switch E at the center of the multi-directional operation switch 9a in the display mode indicated by N4, selection of "**" is determined. The screen is switched to the display image of the main input unit 7** of the default screen in a predetermined time.

Next, if the driver 3 presses and turns on the switch E at the center of the multi-directional operation switch 9a in the display mode indicated by N5, selection of "XXX BROADCAST" is determined. The screen is switched to the display image of the main input unit 7 of the default screen in a predetermined time.

Next, if the driver 3 presses and turns on the switch E at the center of the multi-directional operation switch 9a in the display mode indicated by N/6, selection of "XXX RADIO" is determined. The screen is switched to the display image of the main input unit 7 of the default screen in a predetermined time.

Next, if the driver 3 presses and turns on the switch E at the center of the multi-directional operation switch 9a in the display mode indicated by N7, selection of "XXX NO. 1" is determined. The screen is switched to the display image of the main input unit 7 of the default screen in a predetermined time.

As shown in the figures, when the driver concentrates on driving and it becomes necessary to operate the audio components or the air conditioner the driver can easily find out the position of the main input unit 7 by groping for the main input unit 7 with the recess part H as a guide although the driver turns his or her eyes forward. Then, the driver inserts his or her fingertip into the recess part H formed on the lower side of the main unit case 13 and grasps the main input unit 7 tightly with his or her palm, whereby naturally the periphery of the jog dial 11 strikes the finger roots.

Next, as the driver rotates the jog dial 11, the display color of each entry in the menu display screened on the display screen 4 is changed. After the driver recognizes that the color of the menu entry at any desired position is changed, the driver can turn on the determination switch 20, thereby easily entering the function screen. Since the driver also reaches the operation switches 12A, 12B, and 12C naturally with his or her fingertip in a grip state, it is also made possible for the driver to easily operate the operation switches 12A, 12B, and 12C.

The joystick switch operation part 14 is placed in the main input unit 7 so that the upper end part of the joystick switch operation part 14 does not project from the top face of the main unit case 13, so that when the driver grasps the main input unit 7, the joystick switch operation part 14 is not swung or pressed by mistake. Thus, the driver cannot operate the joystick switch operation part 14 unless he or she intentionally inserts his or her finger into the recess part 15 formed in the center of the top face of the main unit case 13.

In this state, the operator's palm does not come in contact with the upper end part of the joystick switch operation part 14, so that the operator does not erroneously operate the joystick switch operation part 14 during operating the jog dial 11 or the operation switches 12A, 12B, and 12C.

The description given above assumes that the driver operates the main input unit 7 with his or her left palm in a vehicle with a right-hand steering wheel; however, a unit having the same configuration as described above is installed in the same place, it is applied to a vehicle with a left-hand steering wheel and the same advantages can be provided.

As described above, according to the embodiment, the driver can grasp the main input unit 7 easily in a groping state, so that it is made possible for the driver to reliably operate the jog dial 11 and the operation switches; the operability can be improved.

Since the driver can operate the joystick switch operation part 14 in a stable state, the driver can precisely convey motion of his or her thumb to the joystick switch operation part 14 and can operate the joystick switch operation part 14 as he or she intends without receiving the effect of vibration of the vehicle or a swinging occurring unexpectedly during operation.

Figure 17:
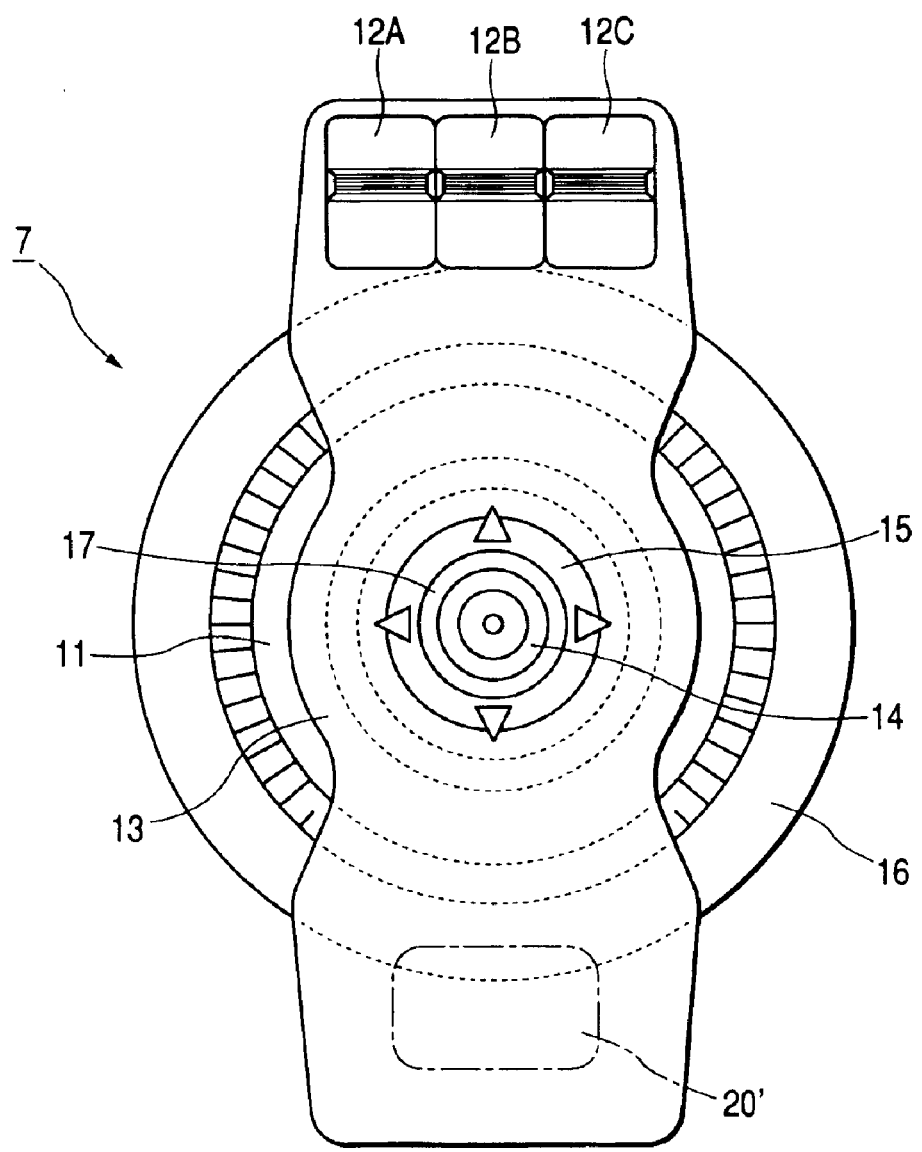
FIG. 17 is a drawing to show a determination switch different from determination switches shown in FIG. 5 in installation position.

In the embodiment, the determination switches 20 are placed at the front of the jog dial 11 contiguously therewith, but may be placed at any positions, needless to say. For example, a determination switch denoted by numeral 20' may be placed at the center of the rear end of the upper side of the main unit case 13 as shown in FIG. 17.

Accordingly, the driver 3 can operate the switches such as the jog dial 11, with the main unit case 13 grasped with his or her palm and pushes the determination switch 20' in the proximity of the wrist of the palm in the state.

Next, determination switches 58 and 59 of different structures from those of the determination switches 20 and 20' will be discussed with reference to FIGS. 18 to 21.

Figure 18:
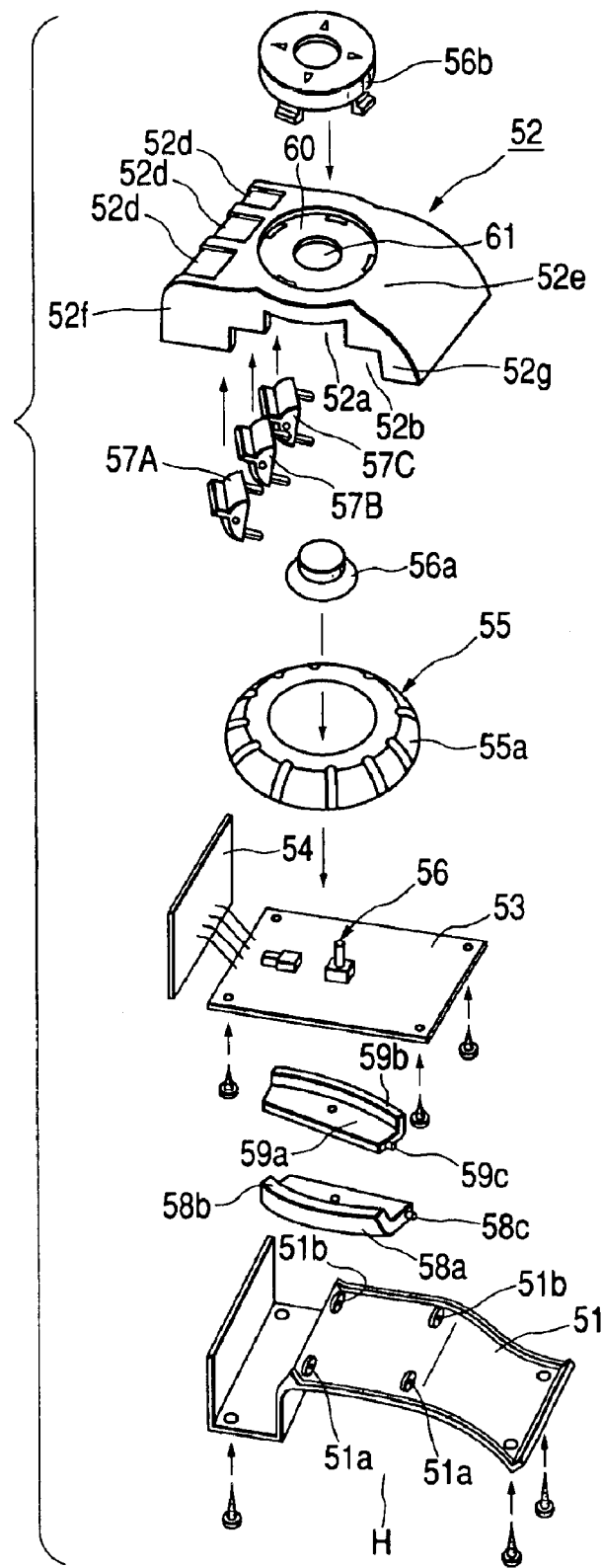
FIG. 18 is an exploded view to describe another embodiment wherein determination switches differ from those shown above in installation positions and largely in structure.
Figure 19:
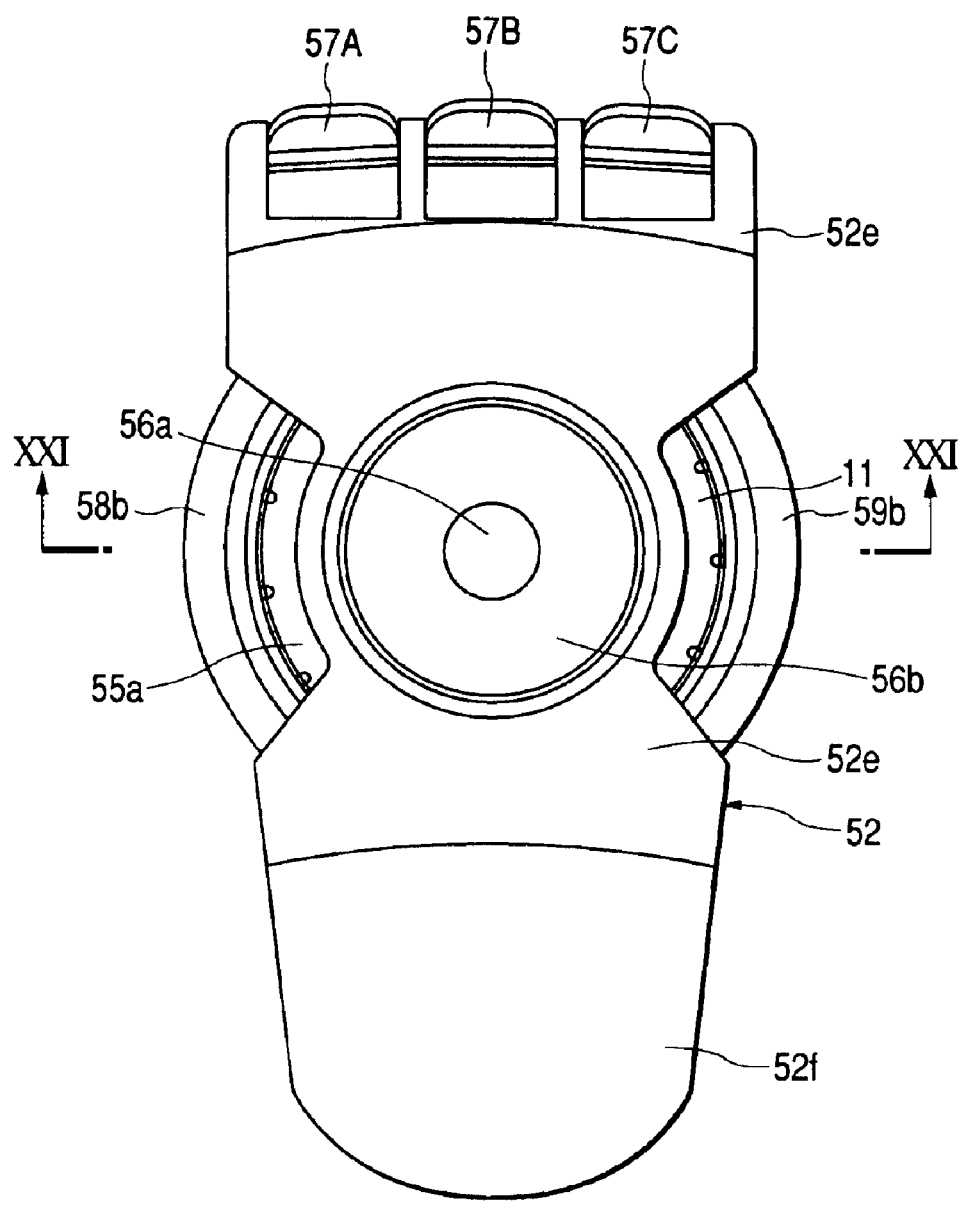
FIG. 19 is a plan view of FIG. 18.
Figure 20:
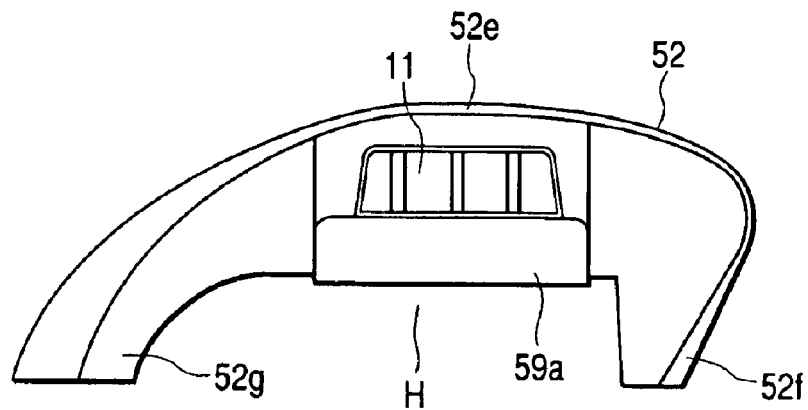
FIG. 20 is a right side view of FIG. 19.
Figure 21:
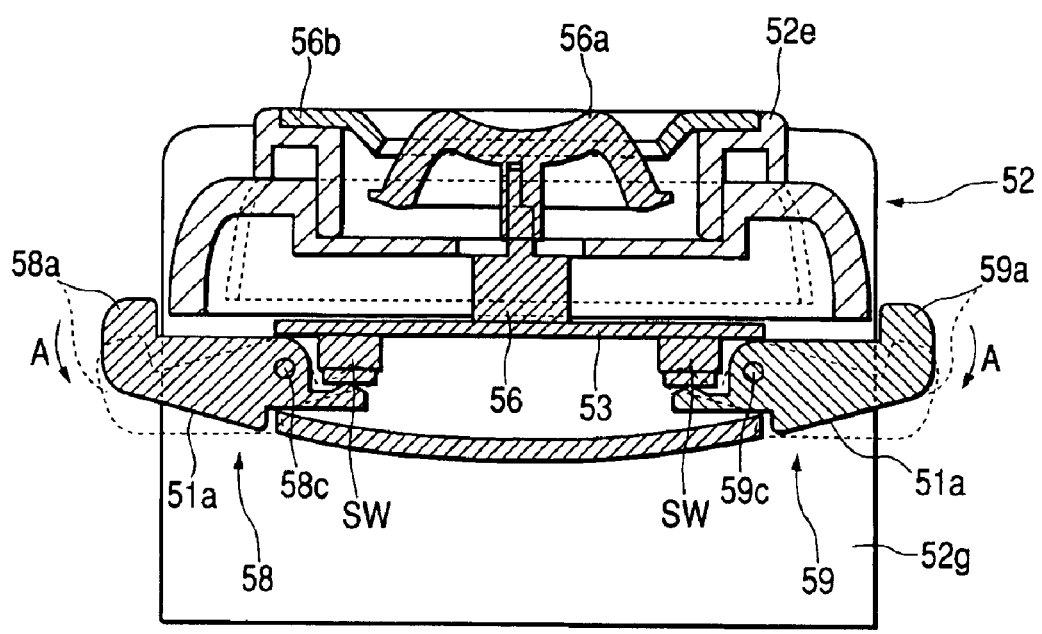
FIG. 21 is a sectional view taken on line XXI—XXI in FIG. 19.
Figure 22:
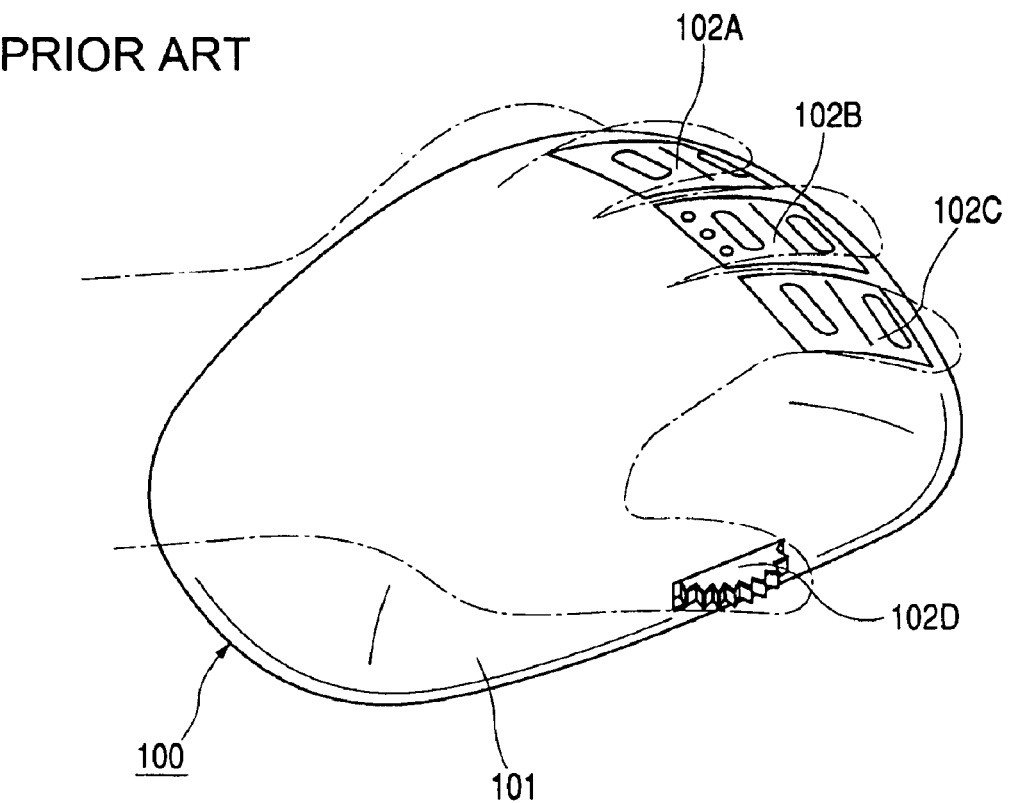
FIG. 22 is a schematic representation to show the configuration of a multifunction switch in a related art.

FIG. 18 is an exploded view of a main input unit 50, FIG. 19 is a plan view of the main input unit 50 viewed from above, FIG. 20 is a right side view of the main input unit 50 in FIG. 19, and FIG. 21 is a sectional view taken on line XXI—XXI in FIG. 19.

In the figures, element 51 is a lower case shaped like a bridge formed in a lower side with a space H having the same function as the space shown in FIG. 6. Element 52 is an upper case engaged with the lower case 51 from above. Both the lower case 51 and the upper case 52 form a main unit case corresponding to the main unit case 13 in FIG. 6. The upper case 52 is formed on opposed sides with a pair of first notches 52a and a pair of second notches 52b wider than the first notches 52a below the first notches 52a continuously.

A jog dial 55a (described below) is exposed from both the first notches 52a so that it can be operated from the outside. Operation parts 58a and 59a of the determination switches 58 and 59 (described later) are placed in the second notches 52b, and circular arc parts of both the operation parts 58a and 59a are projected to the outside of the outer peripheral surface of the jog dial 55a (described below). That is, the driver can easily push down the operation part 58a, 59a simply by downward moving his or her fingertip operating the jog dial 55a.

A plurality of window parts 52d are placed on an almost perpendicular plane formed on the front end side of the upper case 52 and operation switches 57A, 57B and 57C (corresponding to the operation switches 12A, 12B and 12C in FIG. 6 and each having the same functions as the operation switches 12A, 12B, and 12C) are placed in the window parts 52d.

A first circuit board 53 and a second circuit board 54 are housed in the space surrounded by the lower case 51 and the upper case 52.

A jog dial switch 55 operated by the jog dial 55a (corresponding to the jog dial 11 in FIG. 6) and joystick switch operation detection unit 56 to which a joystick switch operation part 56a and an auxiliary ring member 56b are attached are attached to the first circuit board 53. The operation switches 57A to 57C are attached to the second circuit board 54.

A palm support part 52e is formed on the top face of the upper case 52 and a pair of leg parts 52f and 52g is extended downward from the front end and the rear end of the palm support part 52e. A recess part 60 is formed in the proximity of the center of the top face of the palm support part 52e. The joystick switch operation part 56a and the auxiliary ring member 56b are placed in the recess part 60 so that the upper end parts of the joystick switch operation part 56a and the auxiliary ring member 56b do not project upward from the upper opening end of the recess part 60.

Element 61 is an insertion hole made in the center of the recess part 60 into which the joystick switch operation part 56a is inserted.

Next, the operation parts 58a and 59a of the determination switches 58 and 59 will be discussed.

As shown in FIG. 18, the operation parts 58a, 59a is shaped roughly like a circular arc, and wall parts 58b, 59b is formed upright along the outer peripheral margin of the operation parts 58a, 59a. When the determination switches 58 and 59 are assembled, they are disposed so that the lower side of the outer peripheral margin of the jog dial 55a is positioned on the inner sides of the wall parts 58b and 59b.

The operation part 58a, 59a is formed on sides with a pair of circular bosses 58c, 59c, and the pairs of circular bosses 58c and 59c are rotatably supported by pairs of support members 51a and 51b placed corresponding to the lower case 51 for rotation.

In the structure, when the driver rotates the jog dial 55a, for instance, of the jog dial switch 55, and then moves his or her fingertip downward and pushes either of the operation parts 58a and 59a of the determination switches 58 and 59 in the arrow A direction in FIG. 21, the operation part 58a or 59a rotates on the circular boss 58c or 59c by a predetermined angle and is displaced from the position indicated by the solid line to the position indicated by the dashed line. Consequently, a switch SW placed on the first circuit board 53 corresponding to the operation part 58a or 59a is turned on and when pushing the operation part 58a or 59a in the arrow A direction is released, the operation part 58a or 59a is restored to the position indicated by the solid line by a spring force (not shown).

As described above, the recess part is formed in the lower part of the input apparatus according to the invention, so that the driver can easily find out the position of the operation dial with the recess part as a guide and can easily operate the dial.

The palm support part is attached to the leg parts almost at right angle, whereby it is made possible for the operator to emphasize his or her finger and reliably operate the switches.

Since the side-to-side arrangement of the operation switches placed on the leg part matches the side-to-side arrangement of the indicators displayed on the display screen, the operated switch positions and the display screen can be matched with each other, so that the driver can easily understand the switch positions sensuously, namely, simply by seeing the display screen.

As for the main input unit, which represents the operation unit according to the invention, the user uses the operation dial to execute menu selection based on the indicators displayed on the display screen and uses the operation switches to select a function of the vehicle-installed instrument, so that the driver can easily and sensuously understand the switch position to be pressed and dial selection operation while seeing the image displayed on the display screen.

As for the auxiliary input unit attached to the steering wheel, there is provided with the selection function of selecting a frequently used indicator among the indicators selected by operating the operation dial and displayed on the display screen. Therefore, the steering wheel always grasped by the driver is provided with the switch function involved in the frequently used indicator, whereby switch operation is facilitated.

Furthermore, the determination switch is placed in the proximity of the operation dial for determining any desired indicator made selectable by operating the operation dial, thereby enabling the driver to easily operate the determination switch with his or her finger operating the operation dial.

The determination switch has the operation part being put on the operation dial and projected from the peripheral surface of the operation dial to the outside, thereby enabling the driver to more easily the operation part simply by a little moving his or her finger operating the operation dial.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. An input apparatus for vehicle-installed instruments comprising:
    an operation unit being placed in the proximity of a driver's seat, wherein the operation unit comprises:
    a pair of leg parts;
    a palm support part extended in a lateral direction from upper end of the leg parts;
    a plurality of operation switches placed on an outer side of at least one of the leg parts; and
    an operation dial placed on a side of the palm support part;
    wherein the operation switches and the operation dial are operatable by a user to switch any desired indicator from a plurality of indicators displayed on a display screen into a selected status and to enter a selection of the desired indicator, thereby operating a vehicle-installed instrument.

2. The input apparatus as claimed in claim 1, wherein the palm support part is attached to one of the leg parts at an angle smaller than a right angle.

3. The input apparatus as claimed in claim 1, wherein an arrangement order of the operation switches coincides with that of the indicators displayed on the display screen.

4. The input apparatus as claimed in claim 1, wherein the operation dial is operatable by the user to execute menu selection based on the indicators displayed on the display screen; and the operation switches are operatable by the user to select a function of the vehicle-installed instrument.

5. The input apparatus as claimed in claim 4, further comprising:
    an auxiliary input unit attached to a steering wheel operatable by the user to select a frequently used indicator among the indicators selected by operating the operation dial and displayed on the display screen.

6. The input apparatus as claimed in claim 1, wherein the operation unit further comprises a determination switch being placed in the proximity of the operation dial and being operatable by the user to determine and enter the selection of any desired indicator switched into selected status by operating the operation dial.

7. The input apparatus as claimed in claim 6, wherein the determination switch has an operation part being put on the operation dial and projected outward from a peripheral surface of the operation dial.

* * * * *